April 23, 1957 R. K. MASON 2,790,076

ELECTRONIC STORAGE DEVICE

Filed Nov. 5, 1953 2 Sheets-Sheet 1

INVENTOR.
RICHARD K. MASON

BY J. Jancin Jr.
ATTORNEY

April 23, 1957 R. K. MASON 2,790,076

ELECTRONIC STORAGE DEVICE

Filed Nov. 5, 1953 2 Sheets-Sheet 2

INVENTOR.
RICHARD K. MASON

BY J. Jancin Jr.

ATTORNEY

United States Patent Office 2,790,076

Patented Apr. 23, 1957

2,790,076

ELECTRONIC STORAGE DEVICE

Richard K. Mason, Binghamton, N. Y., assignor to International Business Machines Corporation, New York, N. Y., a corporation of New York Application November 5, 1953, Serial No. 390,325

4 Claims. (Cl. 250—27)

Figure 1:
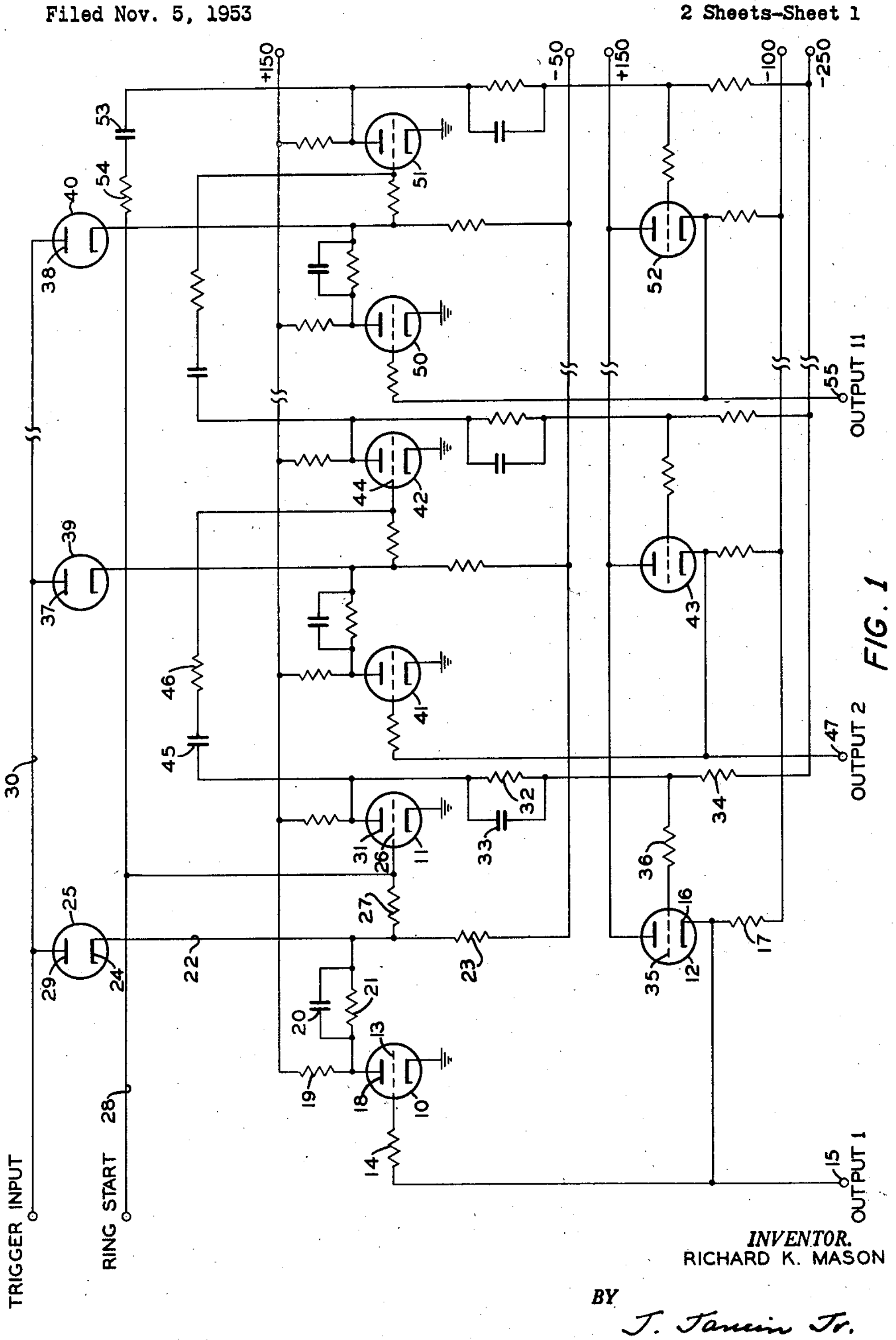

This invention relates to electronic storage devices.

An object of this invention is to provide an improved electronic storage device.

The improved electronic storage device described hereinafter is of the type disclosed in U. S. Patent No. 2,628,309, granted to Ernest S. Hughes, Jr. on February 10, 1953. This type of storage device is one that is adapted to assume stable "on" and "off" conditions and to switch from one condition to the other in response to an applied voltage pulse.

The storage device described in both the aforementioned Hughes patent and in this specification, includes a pair of inverters having alternate states of maximum and minimum conductivity, the second of these inverters being controlled by the first, together with a cathode follower controlled by the second inverter for furnishing an output voltage for exerting a stabilizing influence upon the inverters, said output voltage also being available for application on an external load. However, whereas the Hughes storage device requires a double diode entry arrangement to switch the storage device, the instant invention requires only a single diode.

Accordingly, an object of this invention is to provide an electronic storage device which is well suited to economical methods of manufacture.

In line with the foregoing, another object of this invention is to provide a simplified storage device circuit whereby the initial manufacturing assembly is facilitated.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a schematic drawing of a ring circuit which embodies the principle of the invention.

Figs. 2*a* to 2*e*, inclusive, are timing diagrams which illustrate certain wave forms.

Figure 3:
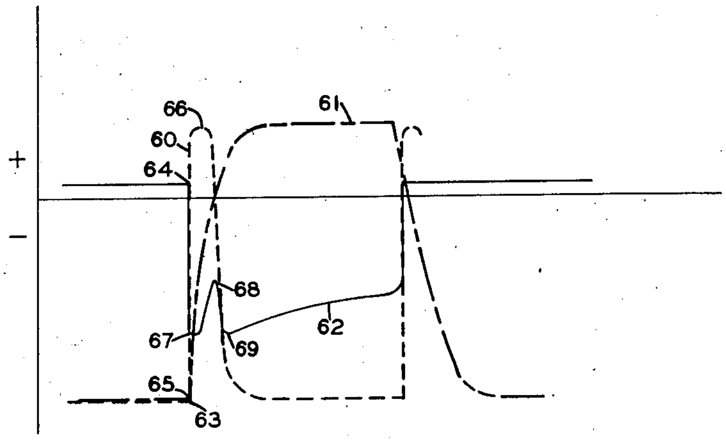

Fig. 3 is a composite oscillographic representation of three of the wave forms shown in the timing diagrams.

Fig. 1 illustrates schematically the first, second and final stages of an eleven point ring wherein each stage comprises a storage unit of the type contemplated by the present invention. The first stage, for example, includes the triode inverters 10 and 11 and a cathode follower 12. Although the inverters 10 and 11 are represented as separate tubes, they may, if desired, be placed in a single envelope. Grid 13 of the inverter 10 is connected through a resistor 14 to the output 1 terminal 15 and to the cathode 16 of cathode follower 12. Cathode 16 is connected through a load resistor 17 to a source of negative potential represented as a —100 volts supply.

The plate 18 of the inverter 10 is connected through a load resistor 19 to a source of positive potential represented as +150 volts. In addition, plate 18 is connected through the parallel combination of a capacitor 20 and resistor 21 to a wire 22. This wire is connected through a resistor 23 to a negative bias supply represented as —50 volts. Wire 22 is also connected to the cathode 24 of a diode 25. The grid 26 of inverter 11 is connected through a resistor 27 to the wire 22 The arrangement is such that when the inverter 10 is conducting, the voltage at the plate 18 thereof is sufficiently low so that the grid 26 of inverter 11 is below cutoff. When the inverter 10 is not conducting, voltage at the grid 26 is raised above cutoff, and the inverter 11 conducts.

Grid 26 of the inverter 11 is also connected to a ring start line 28 used for starting purposes only. Plate 29 of diode 25 is connected to a trigger input line 30. As the description advances, it will be shown that for each positive pulse along trigger line 30, a stage which is "on" is turned "off" and simultaneously turns the next stage "on."

When the first stage is "off," the inverter 10 is cut off and inverter 11 is conducting. The plate 31 of inverter 11 is connected through a resistor 32 which is bypassed by a capacitor 33, and a resistor 34 to a negative voltage source represented as —250 volts. The grid 35 of cathode follower 12 is connected by a resistor 36 to the junction of the resistors 32 and 34. With inverter 11 conducting, the voltage at the plate 31 thereof is sufficiently low so that the grid 35 of the follower 12 is at its low level. Under these conditions the cathode 16 of the follower 12 is held at a negative potential. This negative potential is of a value such that the inverter 10 is held below its cutoff point.

Any of the stages in the ring may be turned "on" by applying to the grid of the second inverter in that stage a negative pulse of a magnitude sufficient to stop conduction. Thus, assuming that all of the stages are "off," and that it is desired to turn the first stage "on," a negative starting pulse may be applied from a suitable source (not shown) to grid 26 of inverter 11, thereby lowering the voltage of grid 26 below the cutoff value. When inverter 11 stops conducting, the voltage at the plate 31 rises, thereby raising the potential of the grid 35 in the cathode follower 12 to its high level. As a result, when cathode follower 12 starts conducting, the voltage at cathode 16 increases to a point above the cutoff value of inverter tube 10. When the tube 10 starts conducting, the voltage of the plate 18 drops, thereby holding the potential at the grid 26 in the inverter 11 below cutoff. This maintains inverter tube 11 in a non-conducting state even after the negative start pulse along line 28 no longer exists. The starting pulse is made sufficiently long to insure that the negative potential at plate 18 is applied to grid 26. This insures that the grid 26 of tube 11 will remain below cutoff and that tube 11 will not conduct after the starting pulse has ceased. The first stage thus is latched in its "on" condition, with the positive feedback voltage from the cathode follower 12 serving to hold the first stage in this condition. The cathode follower 12 in each stage furnishes a positive output pulse as, for example, at output 1 hub 15, during the time in which the stage is "on."

The trigger voltage wave along input line 30 for operating the ring shown in Fig. 1 consists of periodic positive pulses. Each time one of these positive pulses occurs, the stage which has been "on" is switched "off," and the next stage is automatically switched "on." Assuming that the first stage is "on," the first positive pulse occurring along line 30 is applied to plates 29, 37 and 38 of diodes 25, 39 and 40, respectively. The grid 26 of inverter 11 is thereby driven above cutoff, and the inverter 11 starts to conduct. Hence, a resulting negative voltage at plate 31 causes the output of the cathode follower 12 to go negative, whereupon the grid 13 of inverter tube 10 is driven below cutoff. This, in turn, maintains tube 11 conducting. Hence, the first stage is held in its "off" condition.

The second stage of the ring comprises the inverters 41 and 42, and the cathode follower 43, all of which are arranged in a manner identical with the first stage. The grid 44 of the inverter 42 is connected through a coupling capacitor 45 and resistor 46 to the plate 31 of inverter 11 in the first stage. When the inverter 11 starts to conduct, the voltage at plate 31 drops, causing a negative transfer pulse to be applied through capacitor 45 to the grid 44. As is shown in Fig. 2, the width of the negative portion of the transfer pulse from one stage to the next is greater than the width of the positive trigger pulse along line 30. This insures that inverter 42 will be maintained non-conductive by the transfer pulse until the trigger line 30 has been restored to its normal potential. Therefore, the cathode follower 43 will furnish a positive output voltage to output 2 hub 47.

The output pulse at stage two commences when the cathode follower 43 starts to conduct, the latter occurring at the instant when inverter 42 is cut off. The inverter 41 starts to conduct when the voltage at the cathode of cathode follower 43 rises above the cutoff value of inverter 41, and the stage is latched in its "on" condition. Conduction then takes place in the tube 41 and continues until the next positive trigger pulse occurs along line 30. At the occurrence of the next trigger pulse along line 30, inverter 42 starts to conduct, inverter 41 stops conducting, and the cathode follower 43 output voltage drops. The output of cathode follower 43 becomes negative, thereby ending the positive output pulse at output 2 hub 47 in the second stage. From this time on the second stage is maintained in its "off" condition.

As the second stage is switched "off," the following stage automatically is switched "on," and remains "on" until the next positive input pulse along line 30 turns it "off." During the interval while each stage is "on," the cathode follower thereof furnishes the positive output voltage. When the eleventh, or final stage, comprising the inverters 50 and 51 and the cathode follower 52, is switched "off," a transfer pulse is available at the plate of inverter 51. If the ring is to be closed, this transfer pulse is communicated through a capacitor 53 and resistor 54 to the grid 26 of inverter 11 in the first stage, thereby turning the first stage "on." If the ring is to be opened, this feed-back path including capacitor 53 from the last stage to the first one is omitted, thereby causing each stage to remain in its "off" condition until a starting pulse is once again applied by external means along line 28, as described hereinbefore. The entire ring can be cancelled at any time by holding the trigger input voltage along line 30 positive until the transfer pulse is dissipated.

Figures 2A, 2B, 2C, 2D, 2E:
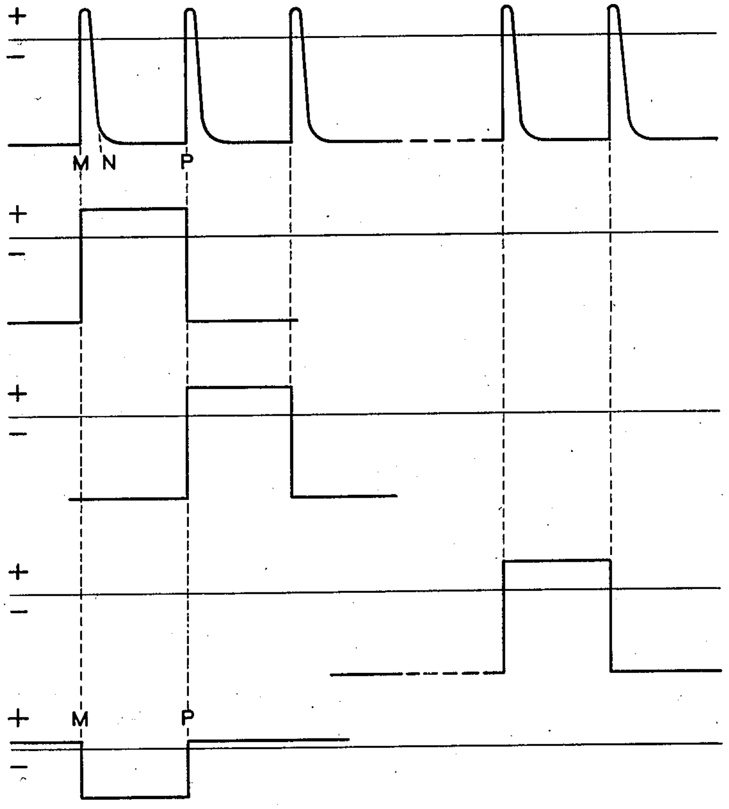

Fig. 2*a* illustrates the general type of voltage wave form which is employed for the input signal along line 30 (see also Fig. 1). This voltage is supplied by a suitable source (not shown) so that normally a steady negative value between points N and P on the wave is maintained. At spaced time intervals, a positive pulse is delivered so as to raise the voltage to a positive value as indicated at the point M. Between the points M and N the voltage decreases rapidly to its normal negative value.

The output pulse of the second stage appearing at hub 47 (Fig. 1) commences at point M (see also Fig. 2*b*) when conduction through cathode follower 43 increases. This occurs at the instant that inverter 42 is cut off. Inverter 42 is caused to cut off when the transfer pulse shown in Fig. 2*e* is applied to the grid 44 via condenser 45 from plate 31. The negative transfer pulse occurs when the input signal positive pulse at point M renders tube 11 conducting.

At point P, the output pulse of the second stage (Fig. 2*b*) ends and the output pulse of the next, or third stage (Fig. 2*e*), commences. That is, at point P, grid 44 is driven above cutoff so that inverter 42 starts to conduct, and cathode follower 43 reduces conduction. The output of cathode follower 43 goes negative, thereby ending the output pulse of the second stage at point P, and from this point on, this stage is maintained in its "off" condition.

As the second stage is switched "off," the following, or third, stage automatically is switched "on," and remains "on" until the next positive trigger input pulse turns it "off." During the interval while each stage is "on," the cathode follower thereof furnishes a positive output voltage. When the eleventh or final stage comprising inverters 50 (see also Fig. 1) and 51, and cathode follower 52, is switched "on," the positive output voltage shown in Fig. 2*d* is available at hub 55.

Fig. 3 is a composite timing diagram representing the input voltage wave, the output voltage wave and the transfer signal modified by the latching action for a single stage, as they would be viewed on an oscilloscope. The curve 60 depicts one signal of the input voltage wave along line 30 (see also Fig. 1). Curve 61 represents the output of a particular stage, for example the second stage. Curve 62 is the transfer signal modified by the latching action which passes from the first stage to the second stage as the former stage is switched "off" and the latter stage is switched "on." In other words, the curve 62 shows the variation of the voltage at the grid 44 of the inverter 42 in the second stage.

After the input voltage starts to swing positive at the point 63, and passes the cutoff value for inverter 11, this inverter starts to conduct. This produces a drop in the voltage at grid 44, commencing at point 64. When this grid voltage drops below the cutoff value for inverter 42 the output voltage of cathode follower 43 commences to rise at point 65. The input voltage of curve 60 reaches its upper limit at point 66, and then commences to drop. The transfer pulse 62 reaches its lower limit at point 67 and then commences to rise to point 68. The transfer signal pulse which is caused by the conduction of tube 11 when the input pulse is applied thereto continues to rise. However, due to the latching action of cathode follower 12, the voltage drops rapidly to point 69 when inverter 10 is caused to stop conducting. It must be recognized that a time lag occurs between the application of the input pulse along line 30 to grid 26, and the output pulse of plate 18 also to grid 26.

I claim:

1. An electronic storage device comprising first and second electron discharge devices each having an output electrode and a control electrode and each being adapted to assume alternate states of maximum and minimum conductivity in response to variable voltages impressed upon the control electrode thereof, a resistance-capacitance network coupling the control electrode of said first electron discharge device to the output electrode of said second electron discharge device for causing said first electron discharge device to assume a state of conductivity opposite to that of said second electron discharge device, a cathode follower having an output electrode and a control electrode, means coupling the control electrode of said cathode follower to the output electrode of said first electron discharge device, means coupling the output electrode of said cathode follower to the control electrode of said second electron discharge device, an input conductor for supplying to the storage device an input voltage that varies intermittently between predetermined limits, and a diode for connecting said input conductor to the control electrode of said first electron discharge device.

2. An electronic storage device comprising a first inverter adapted to assume alternate states of maximum and minimum conductivity, a second inverter adapted to assume alternate states of maximum and minimum conductivity, said first inverter being coupled by a resistance-capacitance network to and controlled by said second inverter so that said inverters are in opposite states of conductivity, feedback means including a cathode follower for applying a signal from the output side of said first inverter to the input side of said second inverter, and storage device input means for individually applying a separate input signal to said first inverter, said input means including a first means for applying a positive input signal to said first inverter assuming a state of minimum conductivity to cause said first inverter to assume an alternate state of maximum conductivity, and a second means for applying a dominating negative input signal concurrently with the positive input signal to said first inverter assuming a state of maximum conductivity to cause said first inverter to assume an alternate state of minimum conductivity.

3. An electronic storage device comprising a first inverter adapted to assume alternate states of maximum and minimum conductivity; a second inverter adapted to assume alternate states of maximum and minimum conductivity, said first inverter being coupled by a resistance-capacitance network to and controlled by said second inverter so that said inverters are in opposite states of conductivity; feed-back means including a cathode follower for applying a signal from the output side of said first inverter to the input side of said second inverter; and input means for independently applying a separate input signal to said first inverter so as to reverse the feed-back signal; said input means including a diode so constructed and connected that a positive input signal to said first inverter assuming a state of minimum conductivity causes said first inverter to assume an alternate state of maximum conductivity, and additionally including a transfer signal line for applying a negative input signal concurrently with and of greater time duration than the positive input signal to said first inverter assuming a state of maximum conductivity to cause said first inverter to assume an alternate state of minimum conductivity.

4. In an electronic ring having a plurality of electronic storage device stages, and means for supplying a common input signal to said stages concurrently; the combination in each of said stages of a pair of inverters each adapted to assume alternate states of maximum and minimum conductivity, with the relationship between said inverters being such that the conductive state of the second inverter normally causes the first inverter to assume an opposite conductive state; input means including a diode for each stage connected to said signal supplying means so that the first inverter assumes a given state of conductivity in response to an input signal; output means for each stage including a cathode follower controlled by the first inverter and coupled to the second inverter for supplying a feed-back voltage to said second inverter, whereby each stage is maintained in a predetermined condition as regards the conductive states of its inverters so long as the common input signal and the feed-back voltage for that stage are of different polarities; and an individual transfer means for coupling a first inverter of one stage to the first inverter of the next following stage in such a fashion so as to nullify the effect of the input signal directed to said input means, and so that a reversal of the one inverter produces an opposite reversal of the other inverter.

References Cited in the file of this patent

UNITED STATES PATENTS

| | | |
|---|---|---|
| 2,442,769 | Kenyon | June 8, 1948 |
| 2,506,439 | Bergfors | May 2, 1950 |
| 2,540,539 | Moore | Feb. 6, 1951 |
| 2,545,924 | Johnstone | Mar. 20, 1951 |
| 2,568,918 | Grosdoff | Sept. 25, 1951 |
| 2,628,309 | Hughes | Feb. 10, 1953 |